United States Patent [19]

Geens et al.

[11] Patent Number: 4,837,486

[45] Date of Patent: Jun. 6, 1989

[54] DC MOTOR SPEED STABILIZING METHOD AND APPARATUS

[75] Inventors: Maurits Geens, Boortmeerbeek; Jean A. Van Daele, Bonheiden, both of Belgium

[73] Assignee: Agfa-Gevaert N.V., Mortsel, Belgium

[21] Appl. No.: 213,464

[22] Filed: Jun. 29, 1988

Related U.S. Application Data

[63] Continuation of Ser. No. 886,311, Jul. 17, 1986, abandoned.

[51] Int. Cl.⁴ .............................................. H02P 5/00
[52] U.S. Cl. .................................... 388/811; 388/822; 388/900; 388/902; 388/909; 388/910; 388/921; 388/933
[58] Field of Search ............................... 318/310–312, 318/314–318

[56] References Cited

U.S. PATENT DOCUMENTS

| 3,883,785 | 5/1975 | Fulcher | 318/314 |
| 3,885,206 | 5/1975 | Hort | 318/318 X |
| 4,072,884 | 2/1978 | Treadwell | 318/314 |
| 4,307,324 | 12/1981 | Regnier | 318/314 |
| 4,314,188 | 2/1982 | Voigt | 318/314 |
| 4,418,304 | 11/1983 | Iwai | 318/314 X |
| 4,498,034 | 2/1985 | Shirakawa | 318/314 |
| 4,564,795 | 1/1986 | Parkes et al. | 318/318 X |
| 4,658,191 | 4/1987 | Okita et al. | 318/341 X |

*Primary Examiner*—Bentsu Ro
*Attorney, Agent, or Firm*—William J. Daniel

[57] ABSTRACT

The speed of a DC motor is stabilized to correspond to a reference speed by a motor driving control that is instantaneously responsive to the interval between reference pulses corresponding to the reference speed and actual observed pulses corresponding to the actual motor speed.

3 Claims, 2 Drawing Sheets

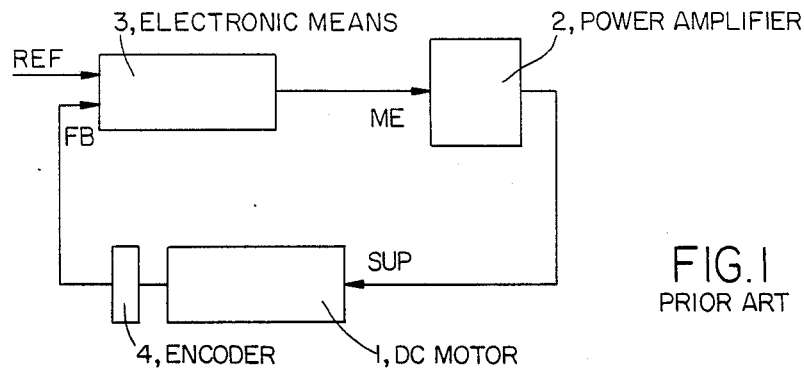
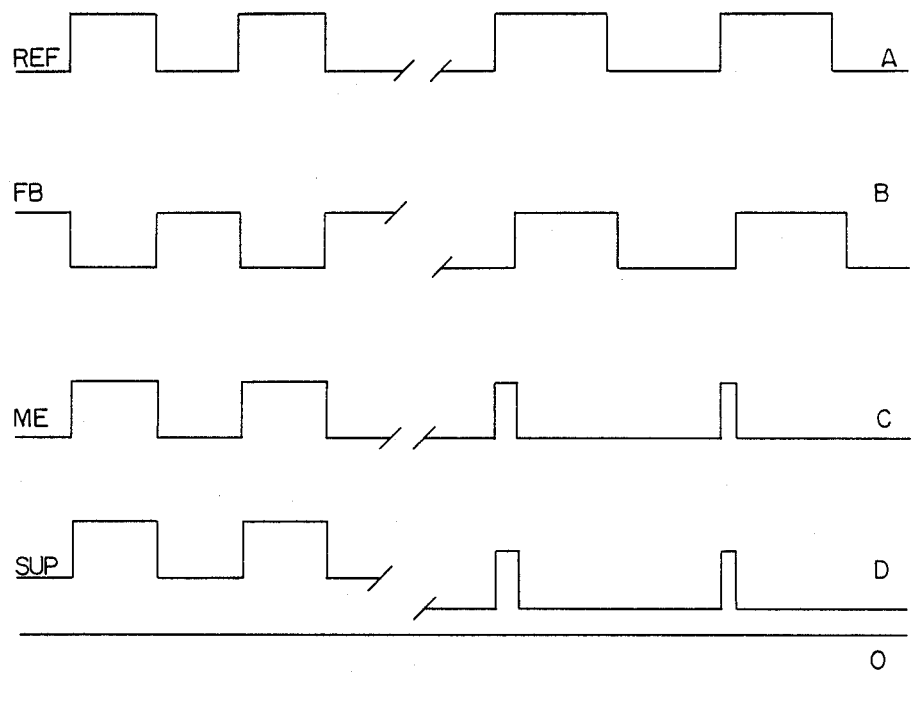

DC MOTOR SPEED STABILIZING METHOD AND APPARATUS

This application is a continuation of application Ser. No. 886,311, filed July 17, 1986, now abandoned.

FIELD OF THE INVENTION

The present invention is in the field of DC motor speed stabilizing.

BACKGROUND OF THE INVENTION

It is known in the art to stabilize the speed of a DC motor at a set reference value by monitoring the power that is fed into the motor in accordance with the deviation of the actual motor speed and a preset reference speed. Speed stabilizing devices are added to a DC motor driver in order to determine said deviation and to increase or decrease the applied power correspondingly.

One group of commonly used speed regulating devices comprises analog electronic circuits. Inherent to analog electronic components are component spreading, temperature drifting, amplifier offset, thermal dissipation and corresponding response fluctuations. These inaccuracies have an influence on the stability of the reference speed indicating signal and affect the properties of the incorporated components.

Pulsed-signal systems overcome the drawbacks of analog systems because of their higher noise margins, i.e. their minor sensitivity to signal level fluctuations. Furthermore, they enable the use of an accurately defined reference clock signal indicative of the reference speed.

The prior art pulsed-signal speed stabilizing methods lack optimization for various setable speed values and variations of the DC motor characteristics.

Inaccurate speed regulation might come forth from the replacement of one DC motor by another specimen not having an identical transfer characteristic. Furthermore, oscillation might come forth from stabilization attempts at other speed values than the reference speed for which the circuit was designed. This last-mentioned inconvenience will be explained furtheron.

OBJECTS OF THE INVENTION

The objects of the present invention are to overcome the above defects of the prior art methods and apparatus.

SUMMARY OF THE INVENTION

The DC motor speed stabilizing method and the apparatus have to be applicable for an arbitrary selected reference speed (within the operational range) and have to be independent of the envisioned DC motor specimen.

To obtain the above-mentioned objects, the present invention provides a method of controlling the speed of a DC-motor comprising the steps of comparing a reference signal indicative of a desired speed and a measurement signal representative of the actual motor speed;

generating a time-modulated signal to control the motor, the modulation ratio of said time-modulated signal being dependent on the result of said comparison.

adjusting the amplitude of said time-modulated signal in order to re-establish an initial, preset modulation ratio.

The DC motor speed stabilizing device of the present invention is based on monitoring of the power that is applied to the motor in accordance with the result of a comparison that is made of the actual motor speed with a set speed. Thereto the DC motor speed stabilizing method of the present invention comprises a double feedback loop. In one feedback loop a motor speed indicating signal and the reference signal are compared. A time-modulated signal is generated, the modulation ratio being related to the result of this comparison. The signal is used to control the period during which the motor is supplied.

As a consequence of the first feedback loop, a deviation of the motor speed from the reference value is immediately followed by a variation of the modulation ratio of said time-modulated signal. However, oscillation preventing purposes may demand that the required amount of power is fed into the motor under control of a time-modulated signal having a preset modulation ratio. To obtain this preset modulation ratio and still to provide the required amount of power, the second feedback loop transforms the time-modulated signal resulting from said comparison into a signal having the preset modulation ratio. The second feedback loop re-established the preset modulation ratio at each speed deviation through adaptation of the signals amplitude so that the required amount of power is still provided.

The relative timing of the two feedback loops on the power control signal is such that detection of the actual motor speed is immediately followed by adaptation of the modulation ratio of the control signal and secondary by means of re-establishment of the preset modulation ratio through adaptation of the amplitude of said signal.

In a preferred embodiment of the present invention the envisioned motor speed is provided in terms of a clock signal having an accurately determined frequency f.i. a crystal-frequency or a synthesized frequency. The actual motor speed is provided by means of a pulse signal that is achieved through motor speed encoding, f.i. by means of a shaft-mounted opto-encoder.

The phase and the frequency of these signals are compared. As a result a pulse signal is generated having a duty cycle that is proportional to the phase deviation of the reference clock signal and the motor speed indicating signal (feedback signal) on the condition that the reference signal leads the feedback signal. The comparison is inactive if the reference signal lags the feedback signal which means that motor deceleration is required. The pulse signal is applied to the motor driver.

Practice has learnt that a modulation ratio of the motor controlling signal equal to 50% is an optimal condition since it provides an adequate range for supplementary accelerating or decelerating regulation (by means of adaptation of the modulation ratio).

The modulation ratio of the signal that is used to control the motor is adjusted to 50% by monitoring the amplitude of said time-modulated signal so that the required amount of power is still provided.

This amplitude can be regulated by means of the supply voltage that is fed into the motor driving circuit. In order to adjust the modulation ratio of the output signal of the motor driving circuit to 50%, the supply voltage should be re-adjusted for different values of the reference speed and of the incorporated motor specimen.

According to a particular embodiment of the method and device of the present invention the second feedback loop affects the supply voltage of the motor driver as a function of the deviation of instantaneous modulation ratio of said time-modulated signal (output of the phase comparator) from the preset value of 50%. The second feedback loop re-establishes the optimal 50% duty cycle. The required amount of power is still provided since the amplitude of the generated signal is affected in accordance with the change of the modulation ratio.

It is already mentioned that both feedback loops do not act upon the motor speed simultaneously. Speed deviations are instantaneously counteracted by adaptation of the modulation ratio of the motor driver controlling signal. Change of this modulation ratio automatically gives rise to change of the supply voltage and hence is followed by re-establishment of the initial duty cycle.

The present invention can be used in every application in which a constant motor speed of a DC motor is envisioned. It has, however, been designed especially for speed stabilization of a DC motor that drives the scanning head in a document scanning device.

The envisioned document scanning device has a fixed transparent platen for supporting a sheet or another document carrying the image to be digitized. The scanner components include a scanning head in the form of a carriage which is reciprocatable by a drive mechanism along a track opposite the platen. The drive mechanism comprises a DC motor that provides a continuous movement of the scanning head along said track. The scanning head carries a scanning light source. Light is emitted towards the document and the image-wise reflected light is directed by means of a mirror to a fixed focusing lens which focuses the light onto fixed sensor means. The intensity pattern of the reflected light is converted into an analog video signal representing the scanned image. The envisioned scanning device is a line-wise scanning device comprising a charge coupled device array.

Non-uniform speed of the scanning head past the document to be scanned implies that the speed at which the detected information is shifted out of the sensor has to be adapted to the instantaneous speed at which the scanning head is transported. The detected information relating to a single line is to be shifted out before the information relating to the next line can be accumulated in the sensor. The speed at which the information is to be shifted out is determined by the speed at which new information is provided and hence by the speed at which the scanning head moves from one line to another.

The envisioned scanner is provided with supplementary features to enable digitization of a selected stroke or window on the document. In order to start the digitization from the top of said stroke and to restart the digitization of the adjacent stroke during the subsequent movement of the scanning head past the document, the position of the scanning head during its displacement is to be monitored accurately.

Position monitoring can be performed by calculation of the distance covered during the elapsed period of time from the motor start. If no speed stabilizing means are provided, this method requires accurate knowledge of the instantaneous velocity of the scanning head and accurate calculation of the distance covered.

On the other hand, if speed stabilizing has been provided, calculation is simplified a lot.

The present invention furthermore comprises a device for controlling the speed of a DC motor, comprising, means for generating a reference signal indicative of an envisioned speed, means for generating a measurement signal representative of the actual motor speed, a comparator with inputs for said reference signal and said measurement signa, for generating at its output a time-modulated signal, the modulation ratio of which is dependent on the deviation of the actual from the envisioned speed, and a motor driver that is controlled by the output signal of said comparator, voltage control means that is connected to the comparator, for controlling the amplitude of the output of said motor driver as a function of the deviation of the actual from the envisioned motor speed, said voltage control means being arranged in such a way that control operations for adjustment of the motor speed (within a given operational range) always result in the re-establishment of a (initial) preset time-modulation ratio.

In a preferred embodiment of the device of the present invention, said reference signal and said measurement signal are pulse signals that are compared in a phase comparator. The phase comparator is characterised in that it is active when the reference signal leads the measurement signal and that it is inactive when the reference signal lags the measurement signal.

The voltage control means often comprise a signal integrator. A time modulation ratio of 50% is preferred because of the optimum stabilizing conditions, as was already explained hereinbefore.

BRIEF DESCRIPTION OF THE DRAWINGS

The present invention will become fully understood from a detailed description given hereinbelow and from the accompanying drawings which are not limitative of the present invention and wherein, FIG. 1 is a simple block scheme of a prior art speed stabilizing device by means of which one of the drawbacks of the prior art methods is illustrated, FIG. 2 show a set of block schemes in correspondence with the outputs of the blocks of FIG. 1.

DETAILED DESCRIPTION OF THE ILLUSTRATED EMBODIMENT

Figure 3:
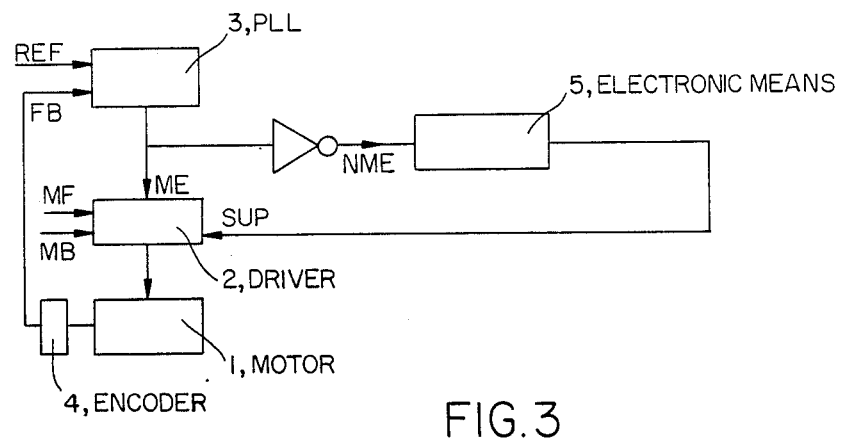
FIG. 3 is a simple block scheme of an embodiment of a speed controlling device according to the present invention.

One of the drawbacks of prior art speed stabilizing devices is explained with reference to the block diagram of FIG. 1 and the waveforms of FIG. 2 that illustrate the operation of the device of FIG. 1.

The speed of a DC motor 1 is controlled by means of the output signal SUP of a power amplifier 2, which generally has a proportional plus integrating plus differentiating control function (PID function). The amplitude of the signal SUP that is generated at the output of amplifier 2, depends on the output signal of electronic means 3. Electronic means 3 generate a pulse signal that has a variable duty cycle which is proportional to the phase difference of the motor speed indicating signal FB, f.i. obtained through motor speed encoding f.i. by means of a motor speed encoder 4, and a reference clock signal REF that is indicational of the envisioned motor speed.

The signal SUP is such that optimum operational conditions are provided at a set reference speed value but may cause problems at another reference speed. If f.i. the reference speed is reduced, the duty cycle of the pulses generated by electronic means 3 decreases and the DC component of the signal SUP is accordingly reduced. However, the amplitude of the pulses remains constant and hence the ratio of this amplitude to the DC component of the signal SUP is enlarged. FIG. 2A is a clock signal (REF), indicational of a reference speed. The right part of the figure illustrates a reference speed that is reduced relative to the initial reference speed shown in the left part. At the initial reference speed (shown in the left part) the supply voltage that is applied to the motor driver, provides ideal operation conditions.

FIG. 2B shows an example of a corresponding motor speed indicating pulse signal FB.

In accordance with the characteristics of the electronic means 3 of FIG. 1, a pulse signal ME having a variable duty cycle that is related to the phase difference of the reference clock REF and the motor speed indicating signal FB, is generated. This signal ME is shown in FIG. 2C. From this figure can be seen that in case of the reduced reference speed, the pulse width of the generated pulses becomes very small. FIG. 2D shows that the amplitude of the pulses at the output of the power amplifier 2 remains constant but the DC component decreases. This enlargment of the ratio of said amplitude to the DC component implements an enhanced probability of oscillation of the incorporated electronic components.

The described problem is counteracted, according to the present invention, by means of a double feedback loop.

The operation of a particular embodiment of a speed stabilizing device according to the present invention as is represented by the simple block scheme of FIG. 3, will be explained by means of the waveforms of figure 4. These waveforms are explanatory examples of the output signals of the blocks of FIG. 3.

Signal REF (FIG. 4A), is a reference clock signal, f.i., a microprocessor generated clock signal having a set frequency, characteristic of an envisioned reference speed value.

Figure 4:
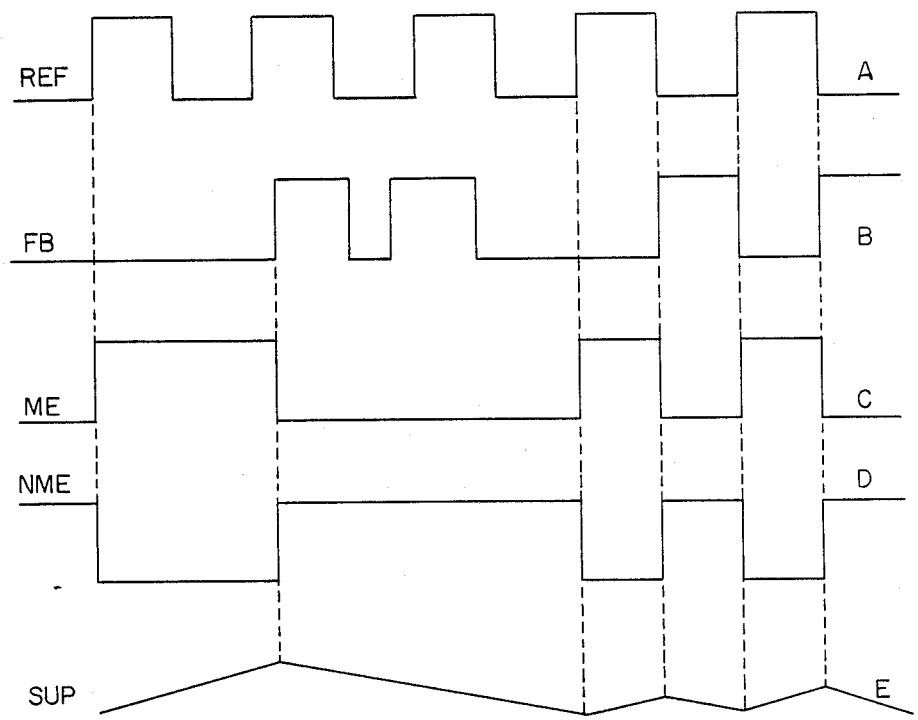
FIG. 4 shows typical waveforms of the feed-back loops.

A motor speed indicating signal, furtheron called feedback signal FB, is a pulse signal that is obtained through motor speed encoding by means of an adequate motor speed encoding device, as is indicated by numeral 4 in FIG. 3. This motor speed encoding device is f.i. a motor shaft-mounted opto-encoder. An explanatory example of a motor speed indicating signal is shown in FIG. 4B.

The phase of the motor speed indicating signal and of the reference signal is compared in a phase comparator, indicated by numeral 3 in FIG. 3. In this particular embodiment the phase comparison is performed by a phase locked loop device PLL. The phase comparator of said phase locked loop device generates an output pulse signal having a variable duty cycle. The generated signal is in the following called ME signal.

FIG. 4C shows the ME signal generated in accordance with result of the phase comparison performed on the reference clock signal REF of FIG. 4A and the feedback signal FB of FIG. 4B. This figure illustrates that the phase comparator used in this embodiment acts on positive transitions of the reference and the feedback signal (positive edges). The duty cycle of the generated output signal ME is proportional with the phase deviation of the reference clock and the actual speed indicating signal when the reference clock leads the feedback signal. The phase comparator is inactive when the reference signal lags the feedback signal. The output signal has a duty cycle of 50% if the feedback signal lags the reference clock signal by 180°.

The ME signal is applied to a motor driver, indicated by numeral 2 in FIG. 3. The motor driver in this embodiment is a push pull driver chip having two input terminals "motor forward" MF and "motor backward" MB. By setting one of these terminals, the direction of the motor revolutions is selected. The chip is additionally provided with a chip enable input and a supply input terminal. The ME signal is fed to the enable input terminal so that the duty cycle of the ME signal controls the period during which the chip is enabled and hence regulates the amount of power that is fed into the motor at a set value of the supply voltage SUP. If the motor (numeral 1 in FIG. 3) is at rest, the output of the phase locked loop device is at high logic level, thereby setting the chip enable high. Adequate input signals are to be applied in order to start the motor.

By setting one of the input terminals "motor forward" MF or "motor backward" MB high (5V) and by enabling the chip at the same time, the motor is started. A motor speed indicating signal FB, such as is illustrated in FIG. 4B, is fed into the phase locked loop device. To the second input terminal of the phase locked loop device a reference signal REF, such as indicated in FIG. 4B, is applied. The duty cycle of the output signal ME of the phase locked loop device, indicated in FIG. 4C, controls the period enabling of the motor driver so as to regulate the power that is fed into said motor.

To re-establish a duty cycle of 50% an additional feedback loop comprising electronic means, indicated by numeral 5 in FIG. 3, is incorporated in the device.

The electronic means are fed with the inverted output signal of the phase locked loop device. This signal, indicated by NME, is shown in figure 4D. The electronic means re-establish a preset value of the duty cycle, in the preferred embodiment equal to 50%, by means of integration of the NME signal. The reference voltage of the integrator is used to set the preset value of the duty cycle.

The integrated signal SUP is shown in FIG. 4E. The scale factor is exaggerated for illustrative purposes.

The output of the integrator is eventually applied to a level shifting device (12V is added to the input voltage value) so that the required voltage level for the driver supply is acquired, and is fed into the supply terminal of the driver chip. This level shifting device is not shown in FIG. 3. The level shifting device of the present invention can be analog or switched power supply regulator, the latter having better heat dissipation characteristics.

The delays of both feedback loops are such that speed deviations with reference to a certain reference speed are immediately counteracted by pulse width adaptation of the output signal of the phase locked loop device and hence have an immediate influence on the period during which the driver chip is enabled (delivering power that is fed in the motor). Subsequently speed deviations are further nullified through adaptation of the supply voltage of the driver chip resulting in adequate amplitude adaptation of the motor controlling signal in order to reach an optimal 50% duty cycle of said signal, independently of the selected reference frequency and the motor type.

We claim:

1. A method of controlling the speed of a DC motor comprising the steps of:

generating a reference signal in the form of a train of pulses having a frequency corresponding to a desired operating speed of said motor;

generating a measured signal in the form of a pulse train corresponding to an actual motor speed, said measured signal train having its pulses out of phase with the reference signal pulses at a predetermined interval when said actual motor speed corresponds with the desired speed, but deviating from said predetermined interval when the actual motor speed deviates from the desired speed;

detecting the actual interval between each reference pulse and the next succeeding measured motor speed pulse when the reference signal pulse leads the next succeeding measured signal pulse but not when the reference signal pulse lags the measured signal pulse;

activating a voltage source to said motor during the thus-detected actual interval between said successive pulses and then deactivating the same for a following interval to intermittently apply a voltage from said source to said motor, such applied voltage being initially adjusted to an equilibrium level selected in relation to said predetermined interval such as to drive the motor normally at the desired operating speed; and modulating the level of the applied voltage continuously up and down in proportion to successive actual activation and deactivation intervals respectively to restore the thus-modulated applied voltage level to said equilibrium level and thereby bring the detected actual interval into correspondence with said predetermined interval.

2. The method of claim 1 wherein the durations of the pulses in the respective trains when said actual speed corresponds to the desired speed are such that the duration of each pulse in the measured signal train equals the interval between the leading edges of the reference pulses minus the duration of the reference pulse.

3. The method of claim 2 wherein the durations of the reference pulses and measured pulses are equal.

* * * * *